United States Patent [19]

Bebber et al.

[11] Patent Number: 4,632,700

[45] Date of Patent: Dec. 30, 1986

[54] METHOD AND APPARATUS FOR HOLDING OR INCREASING THE TEMPERATURE IN A METAL MELT

[75] Inventors: Hans J. Bebber, Mülheim; Dieter Neuschütz, Essen; Heinrich-Otto Rosser, Essen, all of Fed. Rep. of Germany

[73] Assignee: Fried. Krupp Gesellschaft mit beschränkter Haftung, Essen, Fed. Rep. of Germany

[21] Appl. No.: 785,592

[22] Filed: Oct. 8, 1985

[30] Foreign Application Priority Data

Oct. 11, 1984 [DE] Fed. Rep. of Germany ....... 3437333
Nov. 30, 1984 [DE] Fed. Rep. of Germany ....... 3443740

[51] Int. Cl.$^4$ ............................................... C22B 4/00
[52] U.S. Cl. ........................................ 75/10.14; 75/12; 75/49
[58] Field of Search ................................ 75/10, 12, 49

[56] References Cited

U.S. PATENT DOCUMENTS

| | | | |
|---|---|---|---|
| 3,147,329 | 9/1964 | Gage | 13/9 |
| 3,547,622 | 12/1970 | Hutchinson | 75/49 |
| 3,764,297 | 10/1973 | Coad | 75/49 |
| 4,200,452 | 4/1980 | Savov | 75/49 |
| 4,401,464 | 8/1983 | Tivelius | 75/49 |
| 4,466,824 | 8/1984 | Gauvin | 75/10 R |

*Primary Examiner*—Peter D. Rosenberg
*Attorney, Agent, or Firm*—Spencer & Frank

[57] ABSTRACT

Method and apparatus for supplying thermal energy to a metal melt present in a receiving vessel after having been discharged from a melting furnace, the receiving vessel having a central axis, by disposing at least two plasma torches above the melt in the receiving vessel to direct a transferred electric arc at the melt; and operating the torches with alternating current and with a gas which is inert to the metal melt, while cooling the torches with water.

Apparatus according to the invention includes a cover over the top of the vessel, the cover having a passage for the electrodes, and a component establishing a gastight seal between the cover and the electrodes.

15 Claims, 6 Drawing Figures

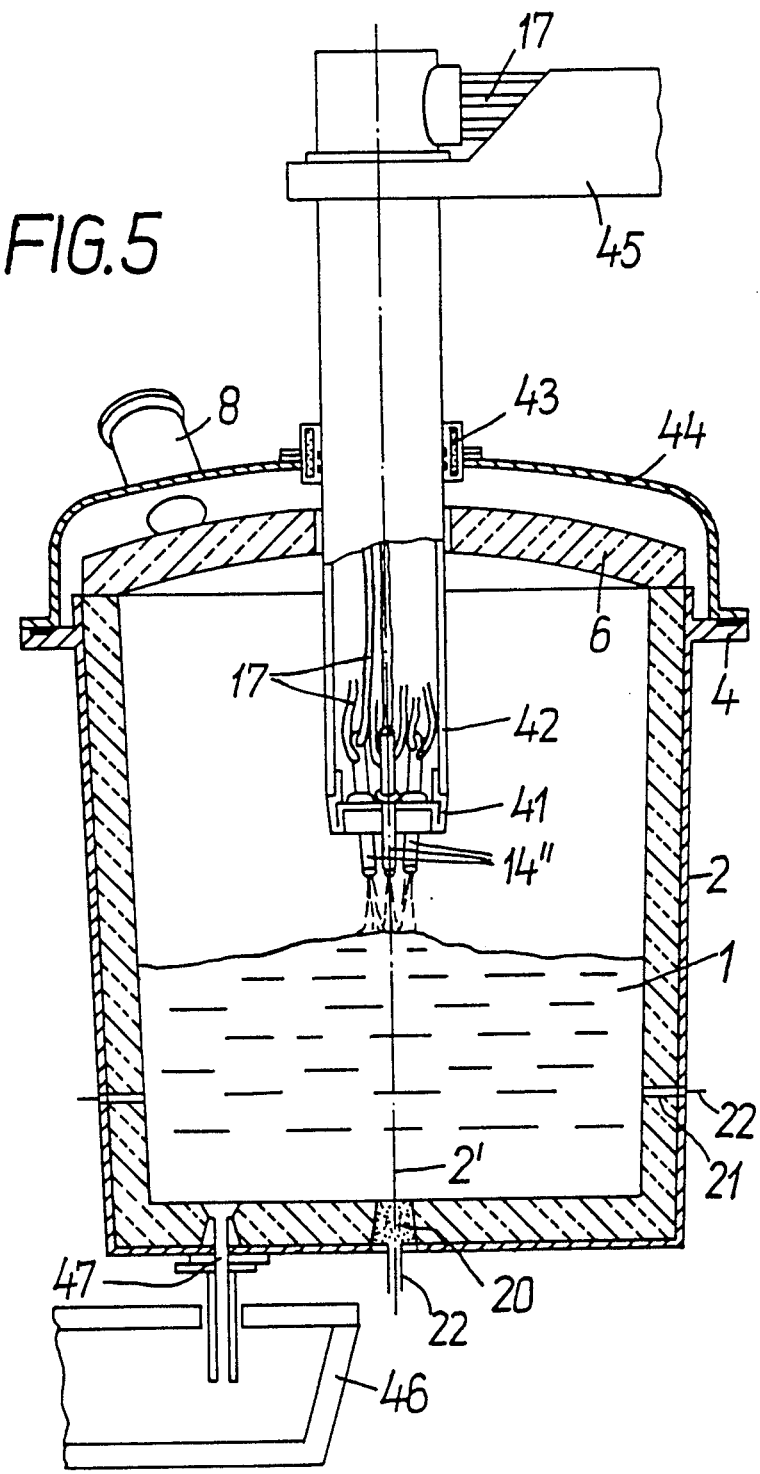

METHOD AND APPARATUS FOR HOLDING OR INCREASING THE TEMPERATURE IN A METAL MELT

BACKGROUND OF THE INVENTION

The present invention relates to a method and to an apparatus for maintaining or increasing the temperature of a metal melt present in a receiving vessel after discharge from a melting furnace.

Temperature losses occur in a melt when charges are taken from the melting furnace, during metallurgical post-treatments, during ladle transport and during standing and casting of the melt, particularly into the tundish of a continuous caster. Metallurgical posttreatment in connection with steel melts may be, for example, alloying, washing with inert gas, blowing in desulphuring agents and vacuum degasification of the melt for the purpose of setting the desired composition, deoxidation and separation of the deoxidation products, homogenization, desulphuring and reduction of the oxygen and nitrogen contents of the metal as well as controlled setting of the casting temperature. Such post-treatments may be effected, for example, in the casting ladle, in a vacuum treatment vessel or in a tundish. The receiving vessel in the sense of the present invention thus also includes vessels through which the melt flows while forming an accumulation level.

It is possible to compensate for the above-described temperature losses by correspondingly overheating the melt in the melting furnace. But then it must be accepted that the furnace lining will be stressed more by the higher temperature and the production rate of the melting furnace will be cut down for the time required for the overheating.

It is known to return the thermal energy lost from the melt by the above-described processes by means of a heating device disposed outside the melting furnace. Such heating devices, which generally are disposed in the casting ladle, are electric arc heaters operating with three graphite electrodes each and with three-phase current. To quickly move the graphite electrodes up and down, they are equipped with a complicated lifting structure and with an electrode regulating device for each one of the heavy graphite electrodes.

Due to the diameter of the electrodes, and the dimensions of the current supplies and of the electrode mounts, the space between the electrodes is relatively large and their spacing from the ladle wall is correspondingly small. Moreover, electromagnetic forces cause the three-phase current arcs of the graphite electrodes, which are not very stable in any case, to burn in the direction toward the ladle wall so that the latter is under great thermal stress and wear of the ladle lining is correspondingly high. To overcome these drawbacks, the graphite electrodes are operated with the shortest possible arcs but this increases the danger of recarbonization of the melt from the electrode graphite.

The known heating device has the further drawback that the passages in the ladle cover can be made gastight against the hot graphite electrodes only with complicated structural measures so that the penetration of air damaging to the metallurgical treatment must be prevented by cost-intensive blowing in of pressurized inert gas.

To avoid premature wear of the walls, it is known to immerse an electrode arrangement composed of two graphite electrodes into the metal melt with the inner, rod-shaped electrode being offset to the rear with respect to the outer, tubular electrode. However, this known heating device has the inherent danger of causing the metal melt to carbonize. Additionally, the outer, tubular electrode is subject to great wear.

Inductive heating of metal melts is also known. This, however, requires equipping all receiving vessels to be used with induction coils. Moreover, this treatment also involves a not insignificant wear of the ladle lining.

SUMMARY OF THE INVENTION

It is an object of the present invention to maintain or increase the temperature of a metal melt which has been delivered into a receiving vessel from a melting furnace, the temperature being maintained or increased by adding energy without chemically influencing the metal melt and while protecting the walls of the receiving vessel.

Another object is to achieve this result by the use of an electrode equipped device which allows an improved seal to be created between the cover of the receiving vessel and the external atmosphere. A further object is to provide a device which is structurally simple and small in size so as to permit its subsequent installation in existing systems.

The above and other objects are achieved, according to the invention, by a method for supplying thermal energy to a metal melt present in a receiving vessel after having been discharged from a melting furnace, the receiving vessel having a central axis, which method comprises disposing at least two plasma torches above the melt in the receiving vessel to direct a transferred electric arc at the melt; and operating the torches with alternating current and with a gas which is inert to the metal melt, while cooling the torches with water.

Cooling with water imparts a temperature to the rear end of the plasma torches which permits gastight seals to be formed between the passage in the cover of the receiving vessel and the plasma burner. Since plasma torches have a noticeably smaller diameter than graphite electrodes, for the same heat output, the impingement areas produced during practice of the method according to the present invention can be moved farther away from the vessel wall in the direction toward the center of the vessel, thus relieving the inner vessel wall of thermal stresses.

Limiting the center distance of the impingement areas from the center axis of the receiving vessel to 3/10 of the radius of the vessel causes the desired protection of the inner wall of the vessel to be enhanced in a particular manner. With the normally symmetrical arrangement of the plasma torches, a partial circle is defined by the impingement areas whose diameter corresponds to twice the distance of the center of the impingement areas from the center axis of the receiving vessel. If the vessels are not rotationally, or radially symmetrical, the above-mentioned ratio must be applied correspondingly to the dimensions of the plane of symmetry of the vessel.

Suitable modifications of the invention are described herein. Thus, the use of argon for the plasma torches effectively prevents carbonization as well as nitrogen enrichment. Arc length ranges of 100 to 500 mm, and preferably 200 to 400 mm, assure reliable energy supplies and adherence to the following operating parameters assures proper operation of the method.

$$r = nl \times (0.755 + 0.315 \sqrt{I}),$$

where r is the distance of the center of each impingement area from the central axis of the vessel, in mm, n is a dimensionless number having a value of 0.375 to 0.625, l is the distance of the output end of each torch from the melt surface, in mm, and I is a dimensionless number having a value equal to the current through each electrode in kA. According to preferred embodiments of the invention, the torches are oriented so that their longitudunal axes are inclined to the central axis of the vessel and so that their output ends are directed toward the central axis of the vessel. This represents an advantageous way for limiting the center distance of the impingement areas from the center axis of the receiving vessel.

When the method is carried out with an even number of plasma torches and the plasma torches are operated with two-phase alternating current, or with a number of plasma torches that is an integral multiple of three, and the torches are operated with three phase current in a star connection such that the melt is the center point at the load end, the current path goes through the plasma torches, the arc generated by the plasma torches and the metal melt. Such operation thus eliminates the placement of a costly counterelectrode at the receiving vessel.

Introduction of inert gas from the bottom into the metal melt causes the melt to be set in motion so that the thermal energy introduced by the plasma torches is distributed more effectively.

Lateral introduction of inert gas into the metal melt from a uniform height causes the thermal energy introduced by the plasma torches to be preferably distributed in the portion of the metal melt disposed above this height. This results in a temperature gradient which permits casting of the melt in sections.

According to a further feature of the invention, the method includes, before the step of operating the torches, introducing gas into the melt via the bottom of the vessel for breaking up and washing aside any solidified slag crust on the surface of the melt. This permits, in a simple manner, reliable firing of the plasma torches.

In order to permit operation of the method free of damaging air influences according to a further feature of the invention, the area of the receiving vessel disposed above the metal melt is filled with inert gas before the plasma torches are fired.

Firing of the plasma torches by one another and lowering them so as to be closer to the metal melt permits the melting of a possibly existing layer of slag and thus current is able to flow into and through the metal melt.

Apparatus according to the invention required to implement the method includes a gastight cover, with this cover, due to the low temperature of the plasma torches, providing a sealed connection in a simple manner by an O-ring.

Since plasma torches permit a much greater fluctuation of the arc length compared a graphite electrodes, the apparatus according to the invention can advantageously be constructed to employ a mounting arrangement and lifting device which is common to all plasma torches. The plasma torches can here be fastened in a simple manner in the bottom insert of a pipe so that only a single passage opening need be gastightly sealed in the cover of the receiving vessel. To be able to realize the lowest possible structural height, the pipe may be of the telescoping type.

In accordance with the invention, the cover may have a separate central region. If the plasma torches are provided with individual lifting devices, and this will essentially be the case if they are placed in an oblique orientation, the lifting devices are preferably fastened at the cover of the receiving vessel. If, then, the cover has a separate central region, the lifting devices can be used for different sized receiving vessels, with the covers of the receiving vessels merely having to all have the same size opening to accomodate the separate central region.

If the cover is to be not just a lid placed onto the receiving vessel, but is designed as a tank which accommodates the receiving vessel and encloses it within itself, it is likewise possible, in an advantageous manner, to operate different sizes of receiving vessels with the same heating device.

Embodiments of the invention are illustrated in the drawing and will be described in greater detail below.

BRIEF DESCRIPTION OF THE DRAWING

FIG. 5 is an elevational, cross-sectional view of a heating device including three plasma torches disposed at the lower end of a common supporting pipe in accordance with the invention.

DESCRIPTION OF THE PREFERRED EMBODIMENTS

Figure 1:
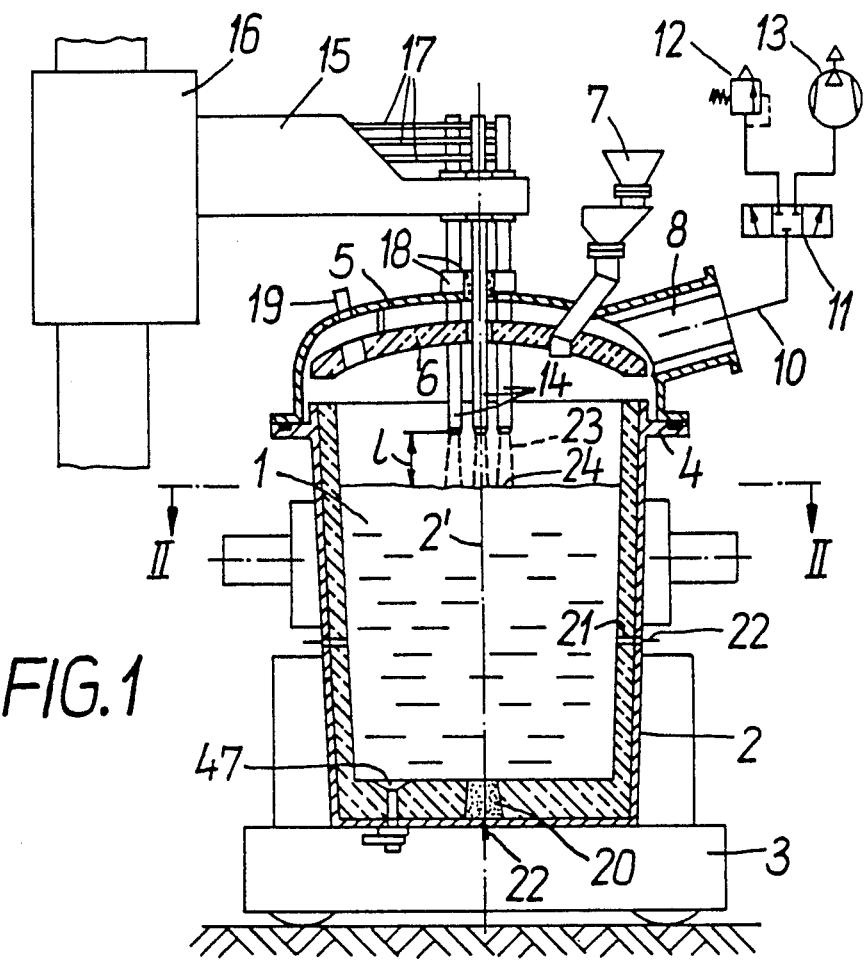
FIG. 1 is a simplified pictorial, partly cross-sectional, elevational view of a casting ladle and its associated heating device composed of three mutually parallel plasma torches in accordance with the invention.
Figure 2:
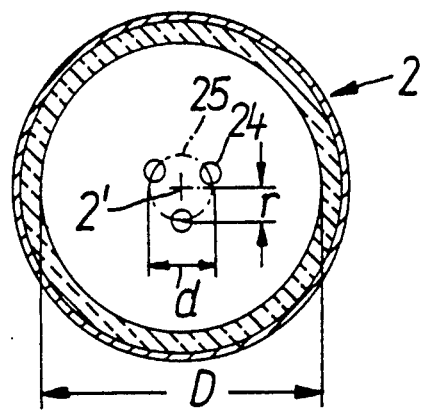
FIG. 2 is a cross-sectional view of the casting ladle seen along line II—II of FIG. 1.

In the embodiment shown in FIGS. 1 and 2, a casting ladle 2 filled with molten metal melt 1 is disposed on a transporting carriage 3. The upper end of ladle 2 has a flange 4 supporting a cover 5, cover 5 being provided at its underside with a heat shield 6 of refractory material. Cover 5 further includes a dosaging device 7 for alloying media as well as an exhaust gas pipe 8 which is connected to an exhaust gas conduit 10, indicated only schematically in FIG. 1. By means of a switching member 11, e.g. a valve, exhaust conduit 10 is connected with the atmosphere alternatingly via a pressure relief valve 12 or a vacuum pump 13.

The device for heating melt 1 includes three plasma torches 14 operated with three-phase current and, as described, for example, in U.S. Pat. No. 3,147,329, each provided with a central electrode and a torch nozzle surrounding the electrode. The parallel aligned torches are held by a common supporting arm 15 which is itself moved up and down by a lifting device 16. Supply conduits 17 for electric current, water and gas leading to the individual plasma torches 14 are installed on supporting arm 15.

To bring the plasma torches 14 through cover 5, the latter is provided with hermetically sealed water cooled passage openings 18. Each seal may here be provided, for example, by an O-ring.

Cover 5 is further provided with a laser transmitter 19 which operates according to the echo sounding principle so as to monitor the fill level of the metal melt, or the height of the bath level. The information provided by transmitter 19 is used to produce a corresponding follow-up movement of plasma torches 14 in order to maintain a constant value for the distance 1, between torches 14 and the surface of melt 1.

Casting ladle 2 has a sink 20 in its bottom and gas entrance channels 21 located in its side wall and distributed uniformly around its circumference. Sink 20 and channels 21 are provided with connections 22 for the supply of inert gas, particularly argon. The bottom of ladle 2 is provided with an outlet 47 having a sliding closure.

At the start of a heating process, exhaust gas conduit 10 is connected, by means of switching member 11, to pressure relief valve 12. Slightly pressurized argon is delivered via plasma torches 14 to fill the space between metal melt 1 and cover 5 so that the air initially present in that space escapes to the external environment through pressure relief valve 12. At the same time, argon can be introduced into the melt through sink 20 and channels 21 and is able to pass through the melt into the space above the bath level. Any crust of slag (not shown) possibly existing on the surface of metal melt 1 will be broken up by the rising gas and the movement of the bath connected therewith and will be washed aside.

Contactless firing of plasma torches 14 is effected with the aid of an internal firing arc in which the plasma gas (argon) flowing through is heated and forms an ionized gas channel extending between the electrodes of plasma torches 14 and metal melt 1. In this electrically conductive gas channel, a primary arc 23 is created by each torch 14 and forms an impact, or impingement, area 24 on the top of the bath of metal melt 1 for each torch 14, arcs 23 are distributed uniformly around the center axis 2' of casting ladle 2.

The centers of the mutually separated impact areas 24 are each spaced at a distance r from the center axis 2', as shown in FIG. 2. This distance r corresponds to one-half the diameter d of a circle 25 passing through the centers of the impact areas 24. To protect the wall lining of casting ladle 2, diameter d should be limited to 3/10, and preferably 2/10, of the inner diameter D of casting ladle 2. In order to uniformly distribute heat throughout metal melt 1 in casting ladle 2, argon is introduced from the bottom through sink 20 into metal melt 1, thus causing the bath to circulate, which results in a uniform temperature in metal melt 1.

If the contents of the ladle is cast in two charges, it is of advantage to heat the upper layer, which is to be cast later, to a higher temperature. This can be accomplished in that argon is introduced into the melt through lateral channels 21. The ascending argon thus causes only the upper layer of the bath to be circulated so that the thermal energy supplied by plasma torches 14 preferably remains in the upper layer; thus a temperature gradient forms in this upper layer of the melt.

For a vacuum treatment of metal melt 1, exhaust gas conduit 10 is connected, via switching member 11, with vacuum pump 13. During this vacuum treatment, plasma torches 14 are brought through passage openings 18 in cover 5 only to the extent of assuring a seal between cover 5 and plasma torches 14. Because this places melt 1 at a greater distance from the torches, they are essentially protected against portions of metal melt 1 which may splash upwardly. After the vacuum treatment, plasma torches 14 are lowered to their operating position so as to perform their heating function.

Figure 3:
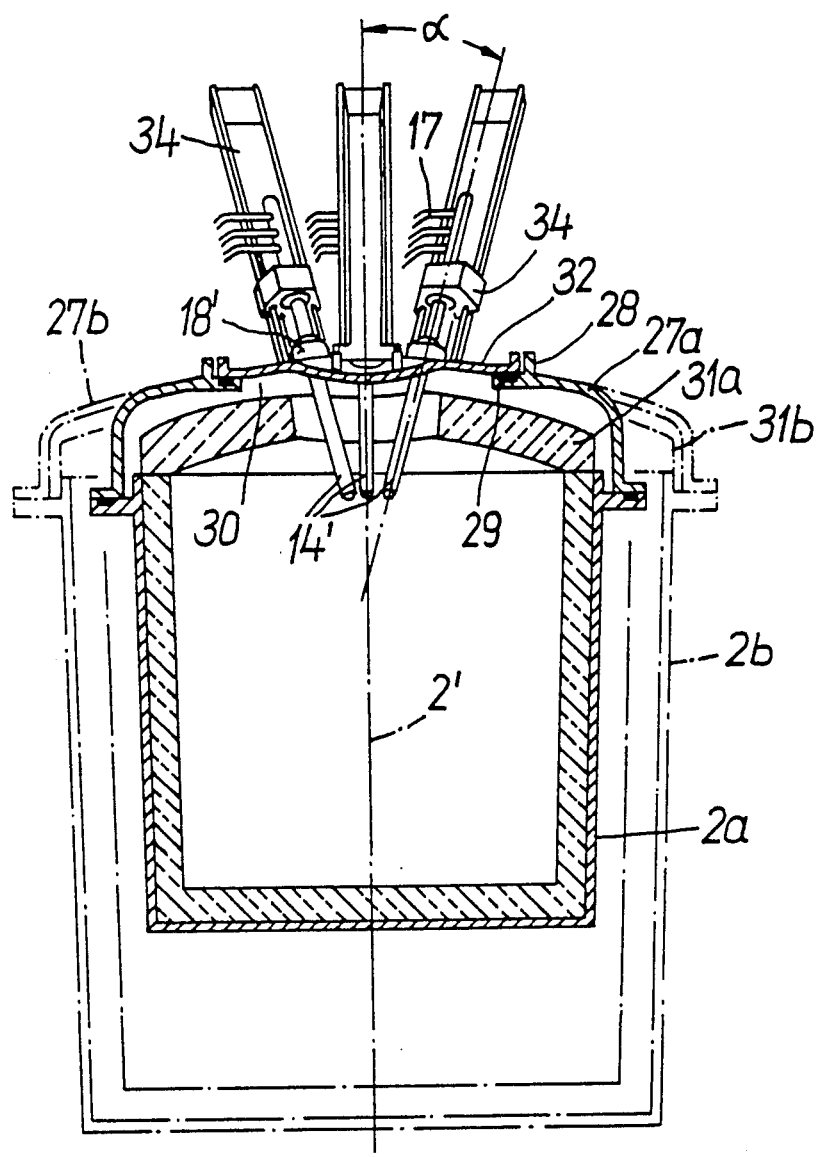
FIG. 3 is a cross-sectional elevational view of a heating device composed of three plasma torches and disposed on a cover insert.

In the embodiment shown in FIG. 3, casting ladle 2a is provided with a cover 27a having a central opening 30 delimited by an annular collar 28 and a flange 29. Opening 30 is closed by a cover insert 32 which rests on flange 29 in a gastight manner. Cover insert 32 is provided with three torch supporting and moving devices 34 which are distributed uniformly around center axis 2' and which are each inclined at an angle $\alpha$ to center axis 2'. Plasma torches 14', whose rear ends are held on torch moving device 34, are brought through cover insert 32 via gastight passage openings 18'.

Cover insert 32 may also rest in the identical opening 30 of a cover 27b which is shown in dot-dash lines in FIG. 3 and which is part of a larger casting ladle 2b. Thus, the heating device, which is fastened to cover insert 32 and is composed of plasma torches 14', can be used for various sizes of casting ladles. To adapt the heating device to the particular casting ladle size, it is of advantage to design the burner moving device so that the value of angle $\alpha$ can be varied.

Figure 4:
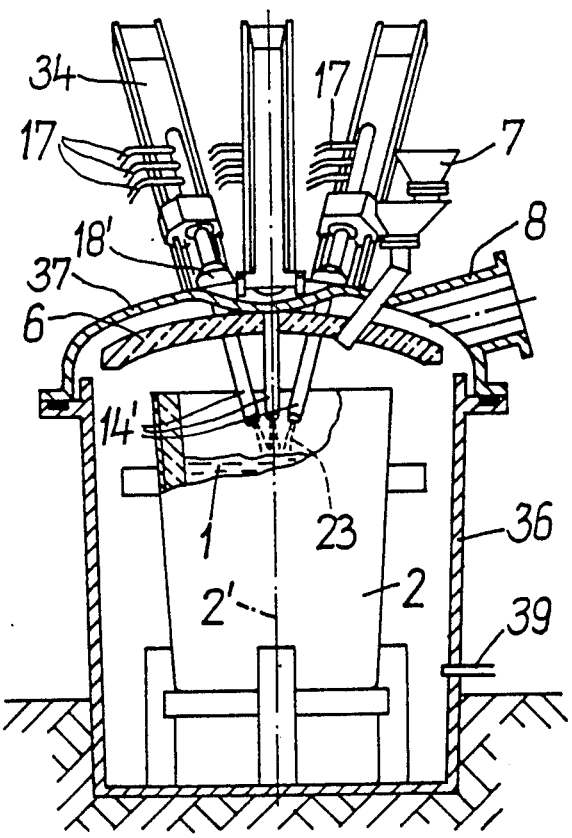
FIG. 4 is a view similar to that of FIG. 1 showing a heating device disposed on a tank in accordance with the invention.

In the embodiment according to FIG. 4, casting ladle 2 is disposed in a steel tank 36 which surrounds it. Tank 36 has a cover 37 which is equipped with three torch supporting and moving devices 34 that are uniformly distributed about center axis 2' and are adjustable in their oblique orientation. Moreover, as already described in connection with the other embodiments, cover 37 is provided with a heat shield 6, a dosaging device 7 and an exhaust gas pipe 8. In this embodiment, the cover for metal melt 1 is formed jointly by cover 37 and tank 36. Various sizes of casting ladles 2 can be placed in tank 36 so that the tank with the heating device including plasma torches 14' can be employed universally. To be able to generate an inert gas atmosphere in tank 36 even before heating starts, the tank wall is equipped with nozzles 39. The inert gas can be introduced into the tank through torches 14' as well as through nozzles 39.

For firing, plasma torches 14' are oriented such that their axes intersect one another at a point lying above the surface of the melt. The arc currents then initially flow directly through the electrodes of plasma torches 14, without taking the path through the melted material. The arc radiation melts a layer of slag possibly existing on metal melt 1 and makes it electrically conductive. Plasma torches 14' can then be placed in a more vertical orientation, corresponding to their normal operating state, in which metal melt 1 is in the path of the arc currents.

In the embodiment according to FIG. 5, plasma torches 14" are installed in an insert member 41 which is disposed at the lower end of a guide or supporting pipe 42. Pipe 42 is brought through a central passage opening 43 in cover 44. Insert member 41, pipe 42 and passage opening 43, which forms a gastight seal with respect to pipe 42, are cooled with water.

Additionally, insert member 41 and pipe 42 are covered with a refractory mass. Pipe 42 is held by a supporting arm 45 and is moved up and down by this arm through cover 44. In the embodiment shown in FIG. 5, a tundish 46 is disposed below the bottom of the casting ladle so as to transport the metal melt into a continuous caster (not shown). Tundish 46 is supplied through an outlet 47 disposed at the bottom of casting ladle 2 and provided with a sliding closure. The above-described device according to FIG. 5 permits, on the one hand, joint movement of plasma torches 14" by means of only a single lifting device and, on the other hand, the use of very short plasma torches, which is an advantage for structural reasons, particularly when large masses of melt are heated during casting. Supply conduits 17 for plasma torches 14" are brought through pipe 42 and supporting arm 45.

Figure 6:
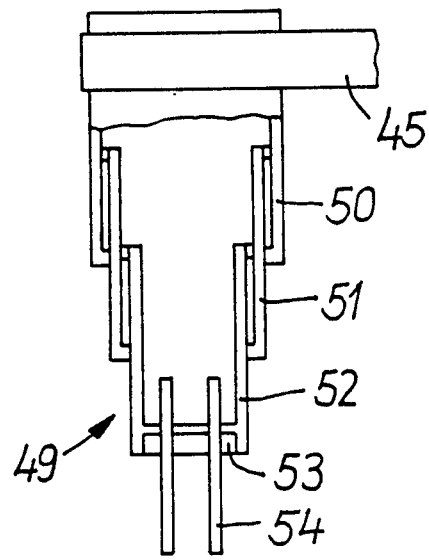
FIG. 6 is a pictorial cross-sectional view of a telescoping supporting pipe equipped with two plasma torches.

In the embodiment according to FIG. 6, a central pipe 49, which can replace pipe 42 of FIG. 5, has a telescoping design and includes three pipe sections 50, 51 and 52, with the front end of innermost pipe section 52 being equipped with an insert 53 in which two parallel plasma torches 54 are accommodated. The two plasma torches 54 are operated with a single-phase alternating current, with the current path extending—alternatingly—from one plasma torch through the metal melt to the other plasma burner. Due to the telescoping design of central pipe 49, large lifting heights can be realized with a small initial structural height. The telescoping movements can be effected and controlled in any conventional manner. The interior walls of the sections of pipe 49 can be coated with a refracting coating. For still better understanding one specific, exemplary method is described in greater detail below.

Having undergone vacuum refining, a 50-tonne steel melt in a casting ladle 2 has cooled down from 1,680° C. at the beginning of tapping to 1,580° C. For further metallurgical treatments and subsequent casting on a continuous caster it therefore has to be heated to a temperature of 1,630° C. The steel concerned is a stainless grade for which a maximum carbon content (C content) of 0.03% is prescribed. As a result of vacuum refining, the C content of the melt is 0.027%. Since a plasma torch heating facility is available to raise the temperature and no carburization of the melt is therefore to be feared, this value is adequate to obtain the specified concentration.

The plasma torch heating stand or installation may essentially be designed as that shown in FIG. 4. Casting ladle 2 of 2 mm diameter containing melt 1 is already disposed in the steel tank or vessel 36 having also been used for vacuum refining. Gas-permeable or porous brick 20 (in the above specification also called sink) in the bottom of ladle 2 (shown for instance in FIG. 1) is connected to an argon supply source (not shown), as is inlet nozzle 39. With this set-up, all that is necessary to switch over from vacuum refining to plasma torch heating is to replace the cover used for vacuum refining with cover 37. The latter features a bottom-side heat shield 6 and the top-side equipment shown in FIG. 4, including in particular the pivotably mounted torch moving devices 34, the AC plasma torches 14' attached to them and the torch passage openings 18'.

When the cover 37 is placed in position the plasma torches 14' have already been moved through the hermetically sealed passage openings 18' to such an extent that the front torch ends are located just underneath heat shield 6.

After the cover 37 is closed, the level of melt 1 in the ladle 2 is measured using an echo-sounding level measuring device such as laser transmitter 19. The signal of transmitter 19 serves to adjust the position the plasma torches 14'. At the same time steel vessel 36 is first evacuated by a vacuum pump (not shown) via exhaust gas pipe 8 to 50 Torr and then flooded with argon via inlet nozzle 39.

In the meantime the torches 14' have been moved further into the vessel 36 to a point where the torch nozzles 14' are at a distance of about 350 mm from the surface of the melt and at an angle of 16° to the vertical axis of ladle 2. In this position torch nozzles 14' are—measured from the torch axes—at a horizontal distance of approx. 100 mm from the axis 2' of vessel 2. The torches 14' are now started up in the following sequence:

(a) striking of an auxiliary or pilot arc of the nontransferred type of 280 amperes D. C. and supplying an auxiliary or pilot mass flow of 7 grammes argon per minute to the arc, which forms plasma jets intersecting one another in a distance of about 350 mm from the torches or torch nozzles, respectively, and immediately above the surface of the melt, which is covered with a crust of solified slag;

(b) switching on A. C. voltage and striking the main or primary arcs by supplying a main mass flow of 90 grammes argon per minute additionally to the pilot mass flow rate. The electric current or amperage may increase to 4000 amperes per torch at an arc voltage of 230 volts;

(c) increasing the main mass flow rate to 270 grammes argon per minute and per torch;

(d) switching off the pilot arcs and (e) increasing the electric current to 6000 amperes per torch.

Since the slag crust above the melt is virtually nonconductive, the electric current between the three phases first takes the most direct route via the plasma arcs. The slag thus quickly becomes liquid.

In addition, immediately after the primary arcs have been struck argon flushing of ladle 2 is started. The "eye" which opens up in the centre of the bath surface moves the liquifying slag to the side. Within about 1 minute after torch ignition or striking the bright surface of the liquid metal becomes visible as a circle approx. 0.8 m in diameter surrounded by liquid slag. The throughput rate of the argon bubbling through the melt is 53 grammes per minute.

The inclination of the torches is now adjusted to an angle of 10° to ladle axis 2'. The areas of arc impingement on the melt thus break away from each other and move apart on the surface of the bath up to a mean distance of 200 to 230 mm from ladle axis 2'. They are now located on the bright surface of the liquid steel at the edge of the "eye".

Torch nozzles are now at a distance of only about 300 mm from the bath surface. Arc voltages are about 250 volts and the total power output of the plasma torches 4.5 megawatt.

With the plant in this state, heating is carried out at a rate of temperature rise of 3.3 Kelvin per minute.

17 minutes after igniting the torches the temperature of the melt has reached the requisite temperature of 1,630° C.

The carbon content remains unchanged, as does the hydrogen content. The nitrogen content rises somewhat during plasma-torch heating, but at 0.015%, for example, remains well within specification.

It will be understood that the above description of the present invention is susceptible to various modifications, changes and adaptations, and the same are intended to be comprehended within the meaning and range of equivalents of the appended claims.

What is claimed is:

1. Method for supplying thermal energy to a metal melt present in a receiving vessel after having been discharged from a melting furnace, the receiving vessel having a central axis and a circular inner wall, said method comprising disposing at least two plasma torches above the melt in the receiving vessel to each direct a transferred electric arc at the melt; and operating the torches with alternating current, so that current flows through the melt between the arcs, and with a gas which is inert to the metal melt, while cooling the torches with water, for causing each arc to impinge on a respective area at the surface of the melt such that the center of each impingement area has a distance from the central axis of the vessel which is not greater than 3/10 of the radius of the inner wall of the vessel at the height of the surface of the melt.

2. Method as defined in claim 1 wherein the gas with which the torches are operated is argon.

3. Method as defined in claim 1 further comprising maintaining the plasma torches at a distance of 100 to 500 mm from the surface of the metal melt.

4. Method as defined in claim 3 wherein the distance is 200 to 400 mm.

5. Method as defined in claim 3 wherein the torches are located, oriented and operated such that:

$$r = nl \times (0.755 + 0.315 \sqrt{I}),$$

where is the distance of the center of each impingement area from the central axis of the vessel, in mm, n is a dimensionless number having a value of 0.375 to 0.625, l is the distance of the output end of each torch from the melt surface, in mm, and I is a dimensionless number having a value equal to the current through each electrode in kA.

6. Method as defined in claim 1 wherein each torch has an output end from which an arc is projected and a longitudinal axis, and the torches are oriented so that their longitudinal axes are not parallel to the central axis of the vessel and so that their output ends are directed toward the central axis of the vessel.

7. Method as defined in claim 6 wherein each torch has its longitudinal axis inclined to the central axis of the vessel.

8. Method as defined in claim 7 wherein the torches are located, oriented and operated such that:

$$r = nl \times (0.755 + 0.315 \sqrt{I} - .75 \tan \alpha),$$

where r is the distance of the center of each impingement area from the central axis of the vessel, in mm, n is a dimensionless number having a value of 0.375 to 0.625, l is the distance of the output end of each torch from the melt surface, in mm, and I is a dimensionless number having a value equal to the current through each electrode in kA and $\alpha$ is the angle between the longitudinal axis of each torch and the central axis of the vessel.

9. Method as defined in claim 1 wherein there is an even number of plasma torches and the plasma torches are operated with two-phase alternating current.

10. Method as defined in claim 1 wherein the number of plasma torches is an integral multiple of three, and the torches are operated with three phase current in a star connection such that the melt is the center point at the load end.

11. Method as defined in claim 1 further comprising introducing gas which is inert with respect to the metal into the melt at the bottom of the vessel during at least part of the time that the torches are being operated.

12. Method as defined in claim 1 further comprising introducing a gas which is inert with respect to the metal into the melt at a location below the surface of the melt during at least part of the time that the torches are being operated.

13. Method as defined in claim 1 further comprising, before said step of operating the torches, introducing gas into the melt via the bottom of the vessel for breaking up and washing aside any solidified slag crust on the surface of the melt.

14. Method as defined in claim 1 further comprising, before said step of operating the torches, filling the receiving vessel above the melt with inert gas under pressure.

15. Method as defined in claim 14 wherein said step of operating the torches comprises: placing the torches at a selected distance above the surface of the melt; initiating production of an arc by each torch; and moving the torches toward the surface of the melt.

* * * * *